Aug. 30, 1932.  C. A. IVES  1,874,297
BRAKE CONTROL VALVE
Filed Nov. 27, 1929
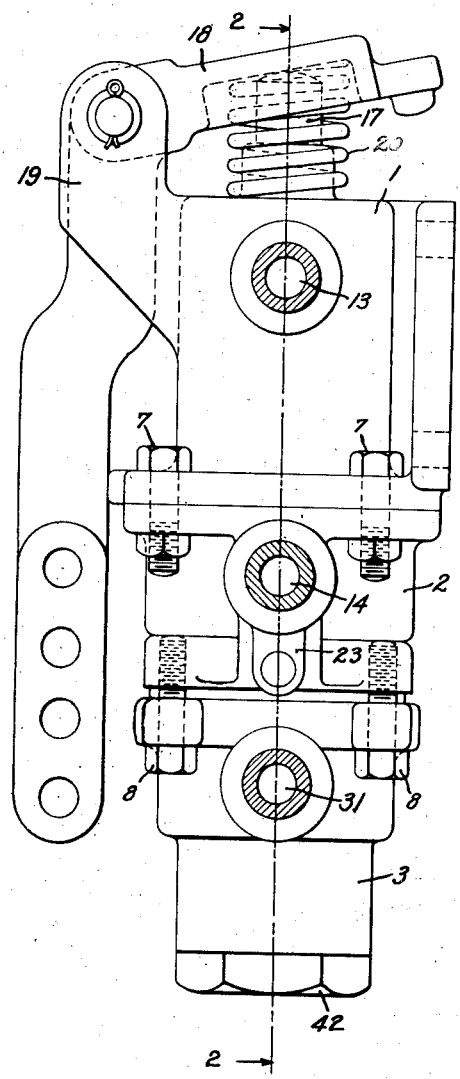
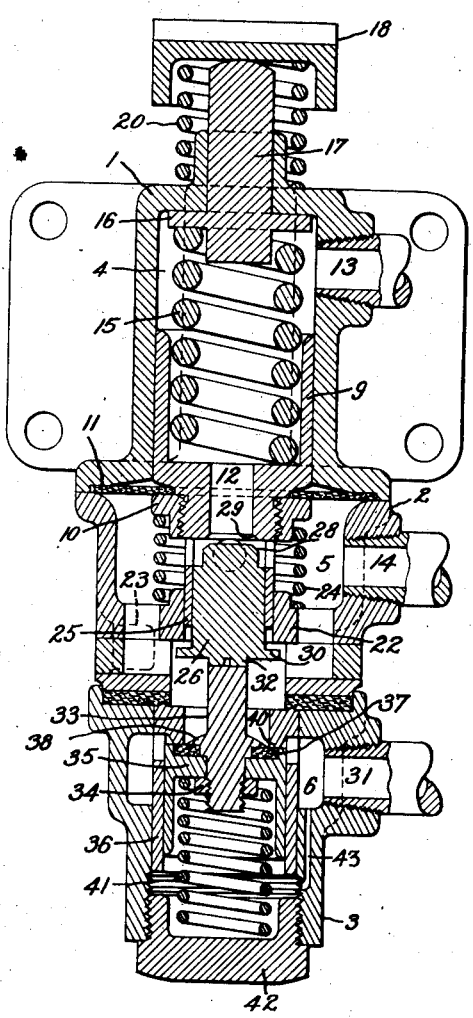
Inventor:
Charles A. Ives,
by Charles E. Mullan
His Attorney.

Patented Aug. 30, 1932

1,874,297

UNITED STATES PATENT OFFICE

CHARLES A. IVES, OF ERIE, PENNSYLVANIA, ASSIGNOR TO GENERAL ELECTRIC COMPANY, A CORPORATION OF NEW YORK

BRAKE CONTROL VALVE

Application filed November 27, 1929. Serial No. 410,211.

My invention relates to brake control valves for controlling the admission and release of fluid pressure to fluid pressure brakes and its object is to provide an improved control valve construction whereby a desired amount of pressure may be established and maintained in the brake cylinder merely by applying the proper force to the operating member of the brake valve.

My invention will be better understood from the following description when taken in connection with the accompanying drawing, which discloses a preferred embodiment of my invention and its scope will be pointed out in the appended claims.

In the accompanying drawing, Fig. 1 is a side view of my improved brake control valve and Fig. 2 is a sectional view of the valve taken on the line 2—2 in Fig. 1.

Referring to the drawing, my improved control valve includes a casing having three sections 1, 2 and 3 which are respectively provided with chambers 4, 5 and 6. The section 2 which is interposed between the sections 1 and 3 is securely fastened to the section 1 by the bolts 7 and to the section 3 by the bolts 8. Each section therefor may be readily replaced merely by removing the proper bolts.

The chamber 4 in the section 1 contains a piston 9 which is fastened by means of a clamping nut 10 to a flexible diaphragm 11 the outer edge of which is securely fastened between the abutting ends of the sections 1 and 2 when they are fastened together by the bolts 7. The piston 9 is provided with a central port 12 which is adapted to connect the chamber 4, connected to atmosphere by an exhaust port 13, to the chamber 5 in section 2 which is connected, by a port 14, to the brake cylinder of the fluid pressure brake system.

For controlling the position of the piston 9, a coil spring 15 is provided in the chamber 4 between the piston 9 and the flange 16 of an operating stem 17 which extends through the upper end of the section 1. The stem 17 engages one end of a lever 18 which is pivotally mounted on a lug 19 on the section 1. The other end of the lever 18 is connected in any suitable manner to a hand or foot operated device (not shown). A suitable spring 20 is provided between the lever 18 and the outside of the valve casing so that movement of lever 18 in a direction to compress the spring 15 also compresses the spring 20.

The section 2 is provided with a hollow central portion 22 within the chamber 5, the portion 22 being supported by the outside casing by means of a plurality of radial ribs 23. A coil spring 24 is provided between the clamping nut 10 for the piston 9 and the central portion 22 of the section 2 so that the spring 24 opposes the downward movement of the piston 9. A slidable bushing 25 which is integral with piston 9 is provided inside the cylindrical opening of the portion 22 and an independently movable piston 26 is slidably mounted inside of the bushing 25. One end of the piston 26 projects above the portion 22 of the section 2 and is provided with a valve surface 28 which is adapted to engage a seat 29 in the piston 9 so as to cut off communication between the port 12 in the piston 9 and the chamber 5 when the piston 9 is moved downward by the spring 15. The piston 26 therefore acts as a guide for the exhaust valve. The other end of the piston 26 projects below the central portion 22 of the section 2 and is provided with a collar 30 which is arranged to engage the central portion 22 so that the upward movement of the piston 26 is limited to the position shown in order that under normal release conditions of the brake valve port 12 is in communication with the chamber 5 and therefore the brake cylinder is connected to atmosphere.

The lower end of the piston 26 also is provided with an extension 32 which normally engages a stem 33 of a valve of the poppet type between chamber 5 and chamber 6 in section 3 which is connected by means of a port 31 to a suitable source of fluid pressure. The stem 33 is fastened by means of a nut 34 to a piston 35 slidably mounted in a bushing 36 in the section 3. The piston 35 has a valve portion 37 of suitable composition material securely held against its upper face by means of a shoulder 38 on the stem 33. The valve portion 37 is normally held against its seat 40 by means of a coil spring 41 placed between the lower face of the piston 35 and a screw cap plug 42 in the end of the section 3 and by air pressure which is admitted to the chamber below piston 35 through port 43.

As shown in the drawing the brake valve is in its normal or non-application position. In this position the spring 41 maintains the valve closed so that no fluid pressure is supplied to the brake cylinder, and spring 24 maintains the pistons 9 and 26 separated so that brake cylinder is connected to atmosphere.

When it is desired to make an application of the brakes, the lever 18 is operated so as to move the stem 17 downward and compress the spring 15. The amount the spring 15 is compressed depends upon the amount the lever 18 is moved against the bias of the spring 20. The compressing of the spring 15 causes the piston 9 to move inward and flex the diaphragm 11 so that the seat 29 is brought into engagement with the valve surface 28 of the piston 26 to cut off communication between the chambers 4 and 5. Therefore, the first movement of the piston 9 which is independent of the inlet valve stem 33 cuts off communication between the brake cylinder and atmosphere. Further downward movement of the piston 9 then causes the downward movement of the piston 26, which by engaging the stem 33 causes the piston 35 to move downward and open communication between the inlet port 31 and the brake cylinder port 14 so that fluid pressure is supplied to the brake cylinder. As soon as the fluid pressure in the chamber 5 builds up to a certain value, depending upon the amount of force applied to the lever 18, the upward force exerted by the fluid pressure on the pistons 9 and 26 overcomes the downward force exerted on the piston 9 by the spring 15 and causes both of the pistons 9 and 26 to move upward together so that the spring 41, assisted by the air pressure in the chamber below piston 35, moves the piston 35 upward and closes the inlet valve. The upward movement of the pistons 9 and 26, however, is not sufficient to bring the collar 30 of the piston 26 into engagement with the central portion 22 of the section 2. Therefore, although the projection 32 may not be in engagement with the stem 33, the air pressure in the chamber 5 maintains the two pistons 9 and 26 together so that valve surface 28 of the piston 26 remains on the seat 29 and prevents the air pressure in the brake cylinder from being exhausted to atmosphere.

When it is desired to release the brakes, the lever 18 is operated so as to remove the downward force exerted against the top of the spring 15. As soon as the downward force exerted on the spring 15 decreases below the upward force exerted by the fluid pressure in the chamber 5, the pistons 9 and 26 move upward together until the piston 26 reaches its upward limit when the piston 9 moves away from the piston 26 so that communication is established between the port 12 and the chamber 5. Fluid then flows from the brake cylinder to atmosphere through the exhaust port 13. When the fluid pressure in the brake cylinder has been reduced a predetermined value the piston 9 moves downward so as to cut off communication between the exhaust port 13 and the brake cylinder. It will be observed that whenever the lever 18 is depressed the exhaust valve is open only when the pressure in chamber 5 and the force exerted by spring 24 exceed the force exerted by spring 15. When the lever 18 is in its full release position and there is no air pressure in chamber 5, the force exerted by spring 24 is greater than the force exerted by spring 15 so that the exhaust valve is held in the open position shown in the drawing.

It will be observed that after an application of the brake has been made a gradual increase or a gradual decrease in the fluid pressure in the brake cylinder may be effected by gradually increasing or decreasing the force applied to the spring 15 by the lever 18.

While I have, in accordance with the patent statutes, shown and described my invention in connection with a preferred embodiment thereof, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:—

1. A brake valve device comprising a casing, a flexible diaphragm in said casing, an inlet valve in said casing, and an exhaust valve including a member movable with said diaphragm and containing the seat of said exhaust valve and an independently movable member mounted in said casing in operative relation with said inlet valve and having a valve surface in cooperative relation with said valve seat whereby movement of said diaphragm in one direction effects the closing of said release valve and the subsequent opening of said inlet valve by the movement of said independently movable member.

2. A brake valve device comprising a casing, a flexible diaphragm in said casing, an inlet valve in said casing, an exhaust valve including a member movable with said diaphragm and containing the seat of said exhaust valve and an independently movable piston mounted in said casing between said diaphragm and said inlet valve and having a valve surface which cooperates with said valve seat whereby movement of said diaphragm in one direction effects the closing of said release valve and the subsequent opening of said inlet valve by the movement of said piston, and means for moving said diaphragm in said direction.

3. A brake valve device comprising a casing, a flexible diaphragm in said casing, an inlet valve in said casing, an exhaust valve including a member movable with said diaphragm and containing the seat of said exhaust valve and an independently movable piston mounted in said casing between said diaphragm and said inlet valve and having a valve surface which cooperates with said valve seat, and means for normally maintaining said valve seat away from said valve surface.

4. A brake valve device comprising a casing, a flexible diaphragm in said casing, an inlet valve in said casing, an exhaust valve including a member movable with said diaphragm and containing the seat of said exhaust valve and an independently movable piston mounted in said casing between said diaphragm and said inlet valve and having a valve surface which cooperates with said valve seat, means for normally maintaining said valve seat away from said valve surface, and means for moving said diaphragm so that it is first moved relatively to said piston to bring said valve seat into engagement with said valve surface of said piston and then is moved with said piston to open said inlet valve.

5. A brake valve device comprising a casing, a flexible diaphragm in said casing, means for applying forces of different values to one side of said diaphragm, a chamber adjacent to other side of said diaphragm whereby said diaphragm is subject to pressure exerted by the fluid in said chamber, a member carried by said diaphragm having a port for connecting said chamber to atmosphere and a valve seat, an independently movable piston mounted within said chamber and subjected to the pressure therein and having a valve surface which is arranged to cooperate with said valve seat to close said port, means for normally maintaining said valve seat out of engagement with said valve surface, and an inlet valve for controlling the supply of fluid pressure to said chamber arranged to be opened by said piston when the force exerted on said diaphragm by said force applying means exceeds the force exerted by the fluid pressure in said chamber.

In witness whereof, I have hereunto set my hand this 20th day of November, 1929.

CHARLES A. IVES.